US011536521B2

(12) United States Patent
Tajiri et al.

(10) Patent No.: US 11,536,521 B2
(45) Date of Patent: Dec. 27, 2022

(54) HEAT EXCHANGER ASSEMBLY WITH A MANIFOLD ADDITIVELY MANUFACTURED ONTO A CORE AND METHOD OF FORMING

(71) Applicant: Unison Industries, LLC, Jacksonville, FL (US)

(72) Inventors: Gordon Tajiri, Waynesville, OH (US); Emily Marie Phelps, Bellbrook, OH (US); Dattu G V Jonnalagadda, Ponnur (IN); Joseph Richard Schmitt, Springfield, OH (US)

(73) Assignee: Unison Industries, LLC, Jacksonville, FL (US)

( * ) Notice: Subject to any disclaimer, the term of this patent is extended or adjusted under 35 U.S.C. 154(b) by 865 days.

(21) Appl. No.: 15/903,749

(22) Filed: Feb. 23, 2018

(65) Prior Publication Data
US 2019/0264993 A1 Aug. 29, 2019

(51) Int. Cl.
*F28F 7/02* (2006.01)
*F28F 9/02* (2006.01)
(Continued)

(52) U.S. Cl.
CPC ............... *F28F 19/00* (2013.01); *F02C 7/08* (2013.01); *F02C 7/14* (2013.01); *F28D 7/0008* (2013.01);
(Continued)

(58) Field of Classification Search
CPC .......... F28F 9/02; F28F 9/0219; F28F 9/0224; F28F 19/02; F28F 19/06; F28F 2265/26;
(Continued)

(56) References Cited

U.S. PATENT DOCUMENTS 3,308,879 A 3/1967 Maddocks
4,291,754 A 9/1981 Morse
(Continued)

FOREIGN PATENT DOCUMENTS

CN 105723178 * 11/2014 ............... F28F 7/02
EP 3410054 A1 12/2018
(Continued)

OTHER PUBLICATIONS

High Temp Metals: Inconel 617 Technical Data, retrieved Mar. 26, 2020 from http://www.hightempmetals.com/techdata/hitempInconel617data.php.*
(Continued)

*Primary Examiner* — Henry T Crenshaw
*Assistant Examiner* — Daniel C Comings
(74) *Attorney, Agent, or Firm* — McGarry Bair PC

(57) ABSTRACT

An apparatus and method of forming a hybrid heat exchanger including a first manifold defining a first fluid inlet and a second manifold defining a second fluid inlet. A monolithic core body includes a first set of flow passages in fluid communication with the first manifold and a second set of flow passages is in communication with the second manifold. At least a portion of the first manifold or the second manifold has a tunable coefficient of thermal expansion that is less than a coefficient of thermal expansion of the structurally rigid monolithic core.

22 Claims, 8 Drawing Sheets

(51) Int. Cl.
F28F 19/00 (2006.01)
F28D 7/00 (2006.01)
F28F 21/08 (2006.01)
F02C 7/14 (2006.01)
F28D 7/16 (2006.01)
F02C 7/08 (2006.01)
F28D 21/00 (2006.01)

(52) U.S. Cl.
CPC .............. *F28D 7/16* (2013.01); *F28F 7/02* (2013.01); *F28F 9/02* (2013.01); *F28F 21/087* (2013.01); *F05D 2230/31* (2013.01); *F05D 2260/213* (2013.01); *F05D 2300/177* (2013.01); *F05D 2300/5021* (2013.01); *F05D 2300/50212* (2013.01); *F28D 2021/0021* (2013.01); *F28F 9/0224* (2013.01); *F28F 2265/26* (2013.01)

(58) Field of Classification Search
CPC ......... F05D 2230/31; F05D 2300/5021; F05D 2300/50212
See application file for complete search history.

(56) References Cited

U.S. PATENT DOCUMENTS

| | | | | |
|---|---|---|---|---|
| 5,527,445 | A * | 6/1996 | Palumbo | C25D 5/18 205/103 |
| 6,886,629 | B2 * | 5/2005 | Dietrich | B23K 1/0012 165/166 |
| 7,017,656 | B2 | 3/2006 | Ayres | |
| 7,117,934 | B2 | 10/2006 | Lomax, Jr. et al. | |
| 8,387,248 | B2 | 3/2013 | Razzell | |
| 9,682,782 | B2 | 6/2017 | Borghese | |
| 2009/0101321 | A1 | 4/2009 | Ostersetzer et al. | |
| 2016/0109189 | A1 | 4/2016 | Pilatis | |
| 2016/0231072 | A1 | 8/2016 | Pohlman | |
| 2017/0044982 | A1 * | 2/2017 | Duesler | F02C 7/141 |
| 2017/0342581 | A1 | 11/2017 | Kim | |
| 2018/0045471 | A1 * | 2/2018 | Dietrich | B33Y 80/00 |

FOREIGN PATENT DOCUMENTS

| | | |
|---|---|---|
| JP | 3174970 B2 | 6/2001 |
| JP | 2005520673 A | 7/2005 |
| WO | 20111158832 A2 | 9/2011 |
| WO | 2013118527 A1 | 8/2013 |
| WO | 2015126483 A2 | 8/2015 |

OTHER PUBLICATIONS

Elgiloy: Specialty Metals—Strip Products: Haynes(R) alloy 282, retrieved Mar. 26, 2020 from https://www.elgiloy.com/strip-haynes-alloy-282/.*
The Engineering ToolBox: Thermal Expansion of Metals, retriveved Mar. 26, 2020 from https://www.engineeringtoolbox.com/thermal-expansion-metals-d_859. html.*
The Engineering ToolBox: Thermal Expansion of Metals, retriveved Jun. 11, 2021 from https://www.engineeringtoolbox.com/thermal-expansion-metals-d_859. html.*
Reade: Nickel-Chromium Alloys (NiCr), retrieved Jun. 11, 2021 from https://www.reade.com/products/nickel-chromium-alloys-nicr.*
Metal AM: Gefertec reports on the cost savings offered by its 3DMP Additive Manufacturing technology. Apr. 6, 2018. Retrieved Dec. 20, 2021 from https://www.metal-am.com/gefertec-reports-on-the-cost-savings-offered-by-its-3dmp-additive-manufacturing-technology/.*
Extended European Search Report issued in related European Patent Application No. 19158875.5, 7 pages, dated Jul. 23, 2019, Munich, Germany.
China Academic Journal Electronic Publishing House, "Test and Research Combined Electromoulding", date unknown, 3 pages, China.
Chinese Patent Office, Office Action re Corresponding Application No. 201910137029.7, dated May 22, 2020, 8 pages, China.
Chinese Patent Office, Office Action re Corresponding Application No. 2019031078, dated Dec. 14, 2020, 7 pages, China.
Inconel® alloy 617, Special Metals, www.specialmetals.com, 12 pages, Publication No. SMC-029 Copyright © Special Metals Corporation, 2005.
Haynes® 282® Alloy, Hayes International, www.hayesintl.com, 28 pages, 2008, Kokomo, Indiana.

* cited by examiner

HEAT EXCHANGER ASSEMBLY WITH A MANIFOLD ADDITIVELY MANUFACTURED ONTO A CORE AND METHOD OF FORMING

BACKGROUND

Contemporary engines used in aircraft produce substantial amounts of heat that must be transferred away from the engine in one way or another. Heat exchangers provide a way to transfer heat away from such engines.

Oil can be used to dissipate heat from engine components, such as engine bearings, electrical generators, and the like. Heat is typically transferred from the oil with heat exchangers to maintain oil temperatures at a desired range from approximately 100° F. to 300° F. In many instances, an external environment can be as low as −65° F. or the temperature of the aircraft fuel can be significantly lower than the oil temperatures. In such an example, a flow of cool air can be used to cool the oil at the heat exchanger with force convection. For example, high temperature (>700° F.) and high pressure bleed air can be cooled with ambient bypass air. Other applications utilize air, fuel, and oil to both cool and heat one another, depending on the need.

Additionally, heat exchangers can be placed in the aircraft for dissipating heat generated by electrical systems, such as within an avionics chassis. The heat exchangers can include a plurality of elements, such as conduits, to draw heat from the electrical components. The heat exchanger can be used to dissipate the heat drawn from the electrical components.

BRIEF DESCRIPTION

In one aspect, the present disclosure relates to a method of forming a heat exchanger including: forming a monolithic core having a first set of flow passages; and additively manufacturing onto the monolithic core a first manifold, where the first manifold defines a first fluid inlet that is in fluid communication with the first set of flow passages and at least a portion of the first manifold has a coefficient of thermal expansion less than a coefficient of thermal expansion of the monolithic core.

In another aspect, the present disclosure relates to a method of forming a heat exchanger including: forming a monolithic core having a first set of flow passages from a first material having a first coefficient of thermal expansion; and additively manufacturing a first manifold from a second material different than the first material onto the monolithic core in fluid communication with the first set of low passages having a second coefficient of thermal expansion lower than the first coefficient of thermal expansion.

In yet another aspect, the present disclosure relates to a heat exchanger including monolithic core body having a first set of flow passages and a first coefficient of thermal expansion. A first manifold is unitarily formed with the monolithic core body in fluid communication with and defining a first fluid inlet for the first set of flow passages, and having a second coefficient of thermal expansion that is different than the first coefficient of thermal expansion.

DETAILED DESCRIPTION

Figure 1:
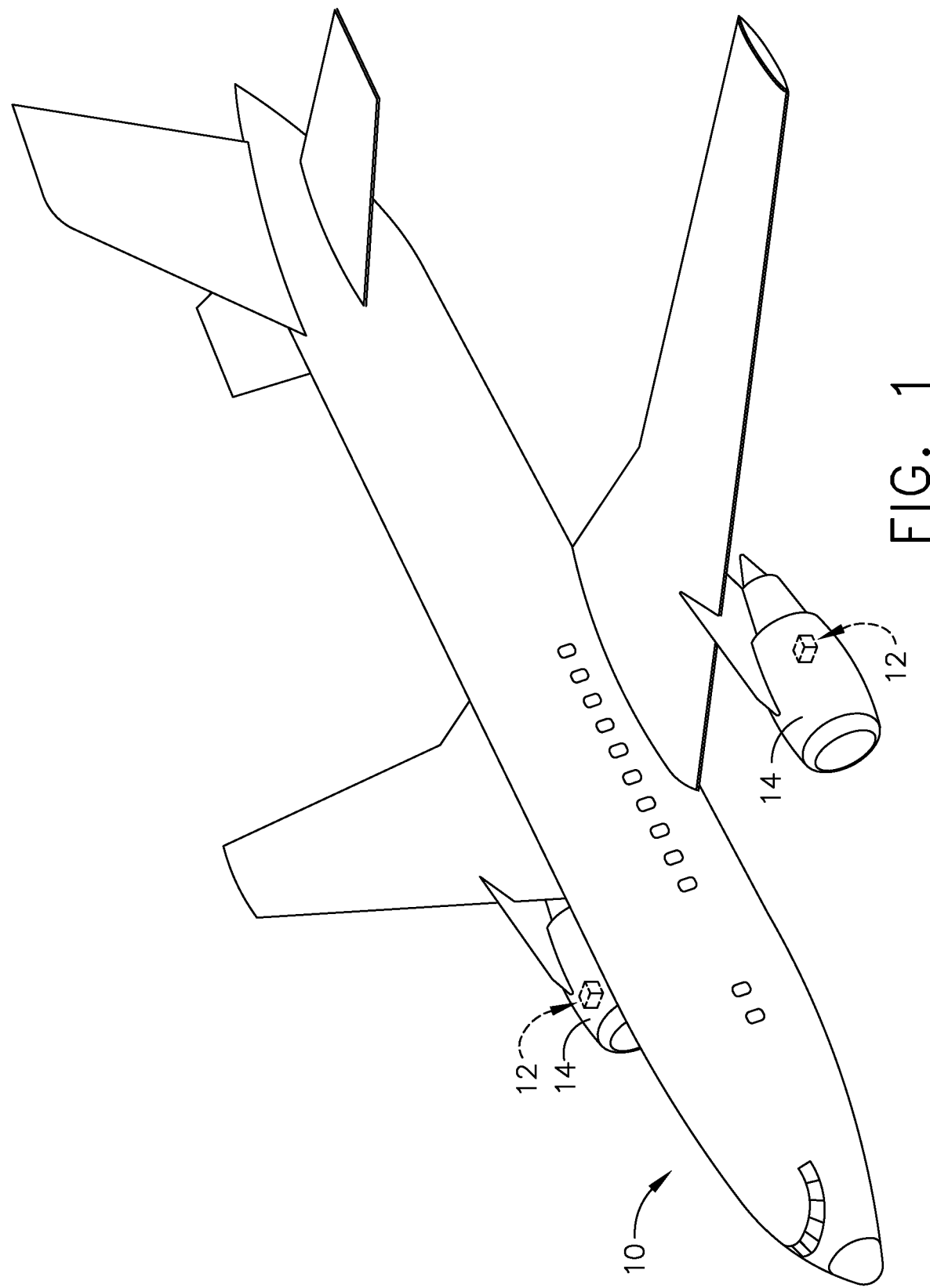
FIG. 1 is a perspective view of an aircraft having a heat exchanger provided in an aircraft engine, in accordance with various aspects described herein.

Aspects of the disclosure described herein are directed to a heat exchanger assembly having different coefficients of thermal expansion to reduce thermal stress. For purposes of illustration, the present disclosure will be described with respect to a heat exchanger provided in the interior of an aircraft engine. It will be understood, however, that aspects of the disclosure described herein are not so limited and may have general applicability within any environment requiring or utilizing heat exchangers or convective heat transfer, such as within a turbine engine for the aircraft, but also including non-aircraft applications, such as other mobile applications and non-mobile industrial, commercial, and residential applications.

As used herein, the term "forward" or "upstream" refers to moving in a direction being relatively closer to an inlet or source of a flow of fluid or gas through a heat exchanger. The term "aft" or "downstream" refers to a direction being relatively closer to an outlet or end of a heat exchanger. As used herein, the term "set" can refer to one or more of an element. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. The exemplary drawings are for purposes of illustration only and the dimensions, positions, order and relative sizes reflected in the drawings attached hereto can vary. As used herein, the term "set" or a set of an article should be understood to include any number of said article, including only one.

Referring now to FIG. 1, an aircraft 10 includes a pair of heat exchangers 12 (shown in dashed line), which are arranged in in a pair of aircraft engines 14 mounted to the aircraft 10. The heat exchangers 12 aid in dissipating the heat generated by the engines 14. It should be understood that the heat exchangers 12 can be located anywhere within the aircraft 10, not just within the engines 14 as illustrated. For example, there can be any number of heat exchangers arranged around the aircraft 10 at any position. While illustrated in a commercial airliner, the heat exchangers 12 can be used in any type of aircraft, for example, without limitation, fixed-wing, rotating-wing, rocket, commercial aircraft, personal aircraft, and military aircraft. Furthermore, aspects of the disclosure are not limited only to aircraft aspects, and can be included in other mobile and stationary configurations. Non-limiting example mobile configurations can include ground-based, water-based, or additional air-based vehicles. Any implementation has its own space constraints and temperature or operational requirements. As such, the design of the particular aspects of the heat exchanger 12 as described herein can be tailored to suit specific installation requirements of the implementation.

Figure 2:
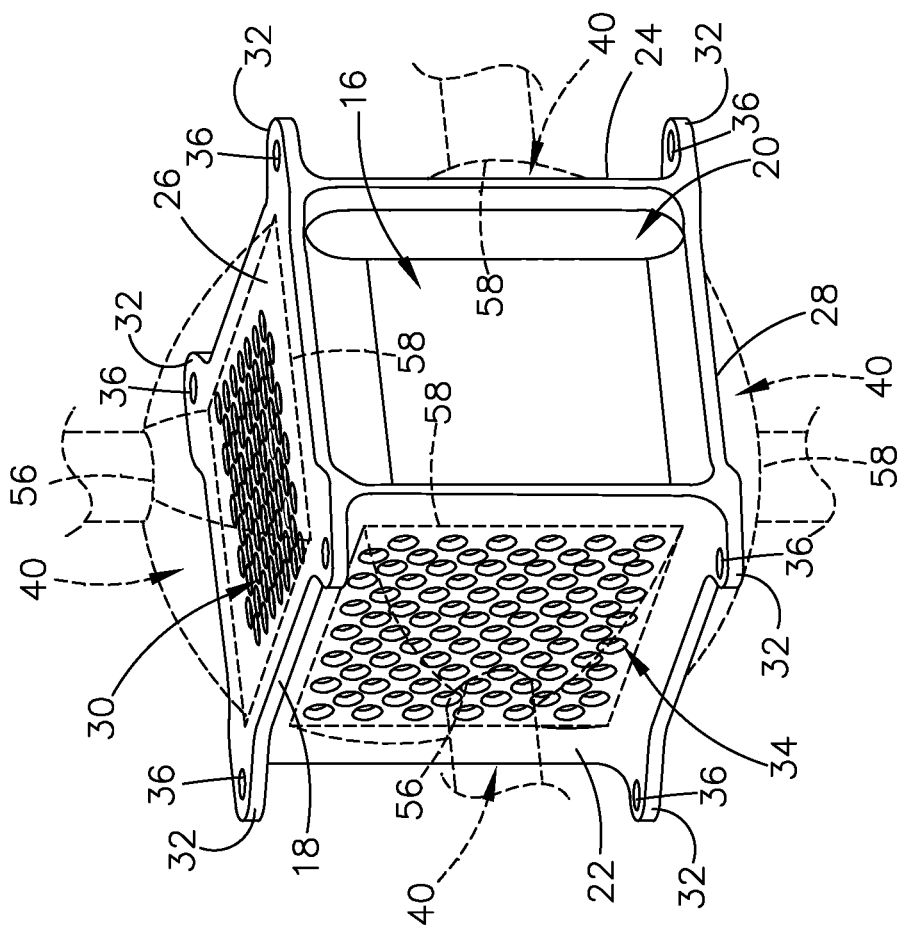
FIG. 2 is a perspective view of a heat exchanger that can be used in the aircraft of FIG. 1.

Referring now to FIG. 2, the heat exchanger 12 can include a heat exchanger core 16 defining an inner section 20, and including walls as a first side 22, a second side 24, a third side 26, and a fourth side 28. A first set of flow passages 30 extending from the first side 22 to the second side 24. A second set of flow passages 34 can extend from the third side 26 to the fourth side 28. The first set of flow passages 30 can be thermally coupled with the second set of flow passages 34, such as being intertwined with one another. Such an intertwining of the first and second sets of flow passages 30, 34 can be complex, with a multi-faceted, convoluted geometry made from additive 3D metal printing, for example. In other example, the flow passages could be treacherous-path or diabolically convoluted geometries. Alternatively, other suitable methods of forming the core 16 having the first and second sets of flow passages 30, 34 are contemplated, such as casting in one non-limiting example. As such, the heat exchanger core 16 can be considered as a monolithic block or monolithic core for the heat exchanger 12. The core 16 is preferably made of a material having a high heat transfer coefficient to facilitate transfer of heat between the first set of flow passages 30 and the second set of flow passages 34. One such suitable material can be aluminum, for example. For high temperature applications, nickel and cobalt alloys are possible alternatives.

An outer housing, walls, or skin 18 can surround the core 16. A set of flanges 32 can extend from the skin 18, and can include apertures 36 provided in the flanges 32. While not shown, one or more load paths can be included with the skin 18, adapted to receive physical or thermal loads during operation of the heat exchanger 12. Such load paths can be formed in the inner section 20, and can be dependent on the geometry of the core 16, or the first or second sets of flow passages 30, 34. The skin 18 can couple to and share such load paths. It is further contemplated that the skin 18 can include additional structures adapted to form the load path along or through the core 16 for carrying a structural or thermal load. Thus, the skin 18 can form the structural boundary for carrying the heat exchanger core 16, and can at least partially surround the core 16, or surround only a portion of the core 16. In one example, the skin 18 can be integral with the core 16. The skin 18, including the outer housing or outer walls and any structural load paths forming the skin 18, can be made of a high tensile strength iron-nickel alloy, having a percentage or nickel concentration tailored to determine a coefficient of thermal expansion for the skin 18 relative to an anticipated operational temperature for the core 16.

A set of manifolds 40, shown as four manifolds 40, can couple to the core 16 or the optional outer housing 18 or skin 18 to provide for ingress and egress of fluid to the core 16. More specifically, the set of manifolds 40 can provide for ingress and egress of fluid to the first and second sets of flow passages 30, 34. Each manifold 40 can include an inlet plane 56 and an outlet plane 58, providing for ingress or egress of fluid to or from the manifold 40. The set of manifolds 40 can provide for ingress and egress of fluid to the first and second sets of flow passages 30, 34 via the inlet plane 56 or the outlet plane 58. As such, for a manifold 40 having a flow entering the first and second sets of flow passages 30, 34, the inlet plane 56 is spaced from the core 16, while the outlet plane 58 can be adjacent the core 16. Similarly, but opposite, a manifold 40 providing for flow coming from the first and second sets of flow passages 30, 34, the inlet plane 56 can be adjacent the core 16, while the outlet plane 58 can be spaced from the core 16. It should be understood that "plane" as used herein, in regards to an inlet plane 56 and an outlet plane 58, should not necessarily represent a geometrical plane or mean geometrically planar, but rather be representative of a boundary or threshold defining an inlet or an outlet for a referenced manifold 40, and can be relative to flow direction through the manifold 40. While shown as having a substantially curved, conic body, with a cylinder extending from the body, it should be understood that any suitable geometry for the set of manifolds 40 is contemplated.

Figure 3:
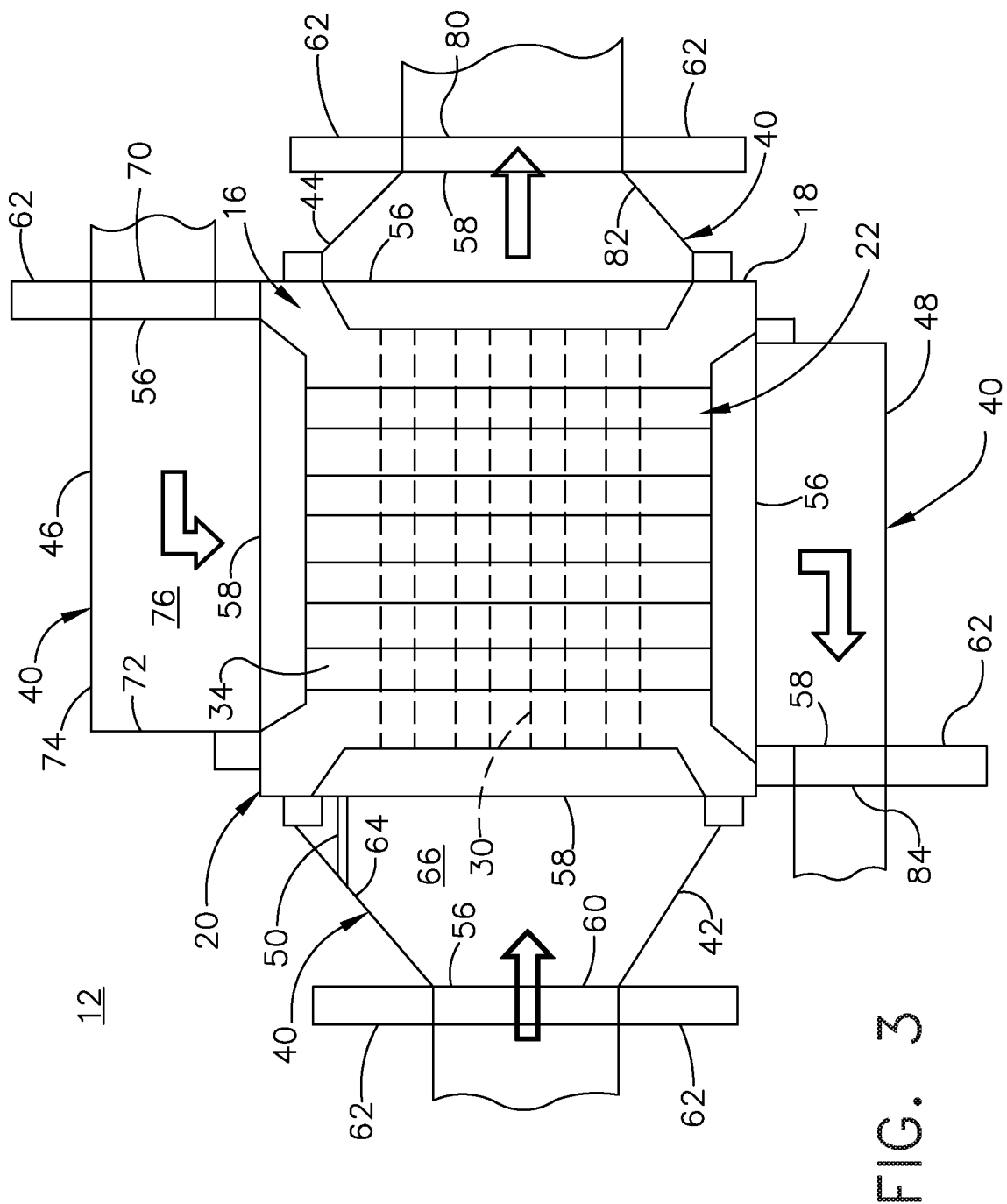
FIG. 3 is a schematic view of the heat exchanger of FIG. 1 having a first manifold and a second manifold coupled to a core, in accordance with various aspects described herein.

Referring now to FIG. 3, the set of manifolds 40 can include a first inlet manifold 42, a first outlet manifold 44, a second inlet manifold 46, and a second outlet manifold 48. One or more manifolds of the set of manifolds can be unitary with or integral with the core 16, formed as a unitary body with the core, or formed as an single whole. A set of mounting flanges 62 can couple to the set of manifolds 40. The mounting flange 62 can mount to a fixed structure for mounting the heat exchanger 12, such as to a portion of the engine 14 of FIG. 1.

The first inlet manifold 42 couples to the core 16 adjacent the first set of flow passages 30 at the first side 22. A rib 50 can extend from the first inlet manifold 42 to the core 16. While only shown as a single rib 50, any number of ribs 50 or similar in-situ structures can be utilized with any manifold 40 described herein adapted to improve structural integrity of the manifolds 40.

A first inlet 60 can be formed in the first inlet manifold 42, spaced from the first set of flow passages 30. One or more sidewalls 64 can at least partially form the first inlet manifold 42 can extend between the mounting flange 62 and the core 16, defining an interior 66 for the first inlet manifold 42. The first inlet manifold 42 can be made of nickel, nickel-cobalt, or a nickel alloy, in non-limiting examples. In one example, the first inlet manifold 42 can be made of an iron-nickel alloy, and can be manufactured to have a specific percentage of nickel, or nickel concentration. Such material provides for a high tensile strength, while having a coefficient of thermal expansion (CTE) that is less than that of the core 16. Particularly, such materials can provide for increased strength and impact resistance up to 600 degrees Fahrenheit (F.), while more particularized alloys can provide for temperatures up to 1000 degrees F. or more.

The first outlet manifold 44 is fluidly coupled to the core 16 adjacent the first set of flow passages 30 at the second side 24. A first outlet 80 can be formed in the first outlet manifold 44, spaced from the first set of flow passages 30. The first outlet manifold 44 can be positioned opposite of the first inlet manifold 42, relative to the core 16, and can fluidly couple to the first inlet manifold 42 via the first set of flow passages 30. The first outlet manifold 44 can include a sidewall 82 and geometry similar to that of the first inlet manifold 42. Similar to the first inlet manifold 42, the first outlet manifold can be made of nickel, nickel-cobalt, or a nickel alloy such as iron-nickel, in non-limiting examples.

A second inlet manifold 46 couples to the core 16 adjacent the second set of flow passages 34 at the third side 26. A second inlet 70 can be formed in the second inlet manifold 46, and can be spaced from the second set of flow passages 34. A first sidewall 72 can extend from the core 16 to a second sidewall 74. The second sidewall 74 can be arranged substantially orthogonal to the first sidewall 72; however, any orientation is contemplated. The first and second sidewalls 72, 74 can at least partially define an interior 76 for the second inlet manifold 46. Similarly, the second inlet manifold 46 can be made of an iron-nickel alloy, and can be manufactured to have a specific percentage of nickel, or nickel concentration.

The second outlet manifold 48 couples to the core 16 adjacent the second set of flow passages 34 at the fourth side 28. A second outlet 84 can be formed in the second outlet manifold 48, and can be spaced from the second set of flow passages 34. The second outlet manifold 48 can be positioned opposite of the second inlet manifold 46 relative to the core 16, and can fluidly couple to the second inlet manifold 46 via the second set of flow passages 34. It is further contemplated that the second outlet manifold 48 can include one or more compliant features.

It should be appreciated that the organization for the heat exchanger 12 and manifolds 40 as shown are exemplary, and that any suitable geometry for the core 16 that provides for a heat exchange between a hot fluid and a cold fluid can form the suitable heat exchanger 12. It should be understood that the manifolds 40 have been illustrated merely for exemplary purposes and can include any suitable shape, profile, arrangement, or attachments for effectively providing one or more fluids to, and removing one or more fluids from the heat exchanger 12 or the core 16.

During operation, a first fluid can be provided through the core 16 along the first set of flow passages 30, such as a hot fluid. Therefore, the first inlet manifold 42, the first set of flow passages 30, and the first outlet manifold 44 can form a hot fluid path. The first inlet 60 can be a hot inlet and the first outlet 80 can be a hot outlet.

A second fluid can be provided through the core 16 along the second set of flow passages 34, such as a cold fluid. Therefore, the second inlet manifold 46, the first set of flow passages 34, and the first outlet manifold 44 can form a cold fluid path. The second inlet 70 can be a cold inlet and the second outlet 84 can be a cold outlet.

During simultaneous flow of the hot fluid and the cold fluid, a heat exchange takes place within the core 16, cooling the hot fluid and heating the cold fluid. An average of the temperatures between the hot fluid and the cold fluid within the core 16 can define a mean temperature for fluids passing through the core 16. Dependent on the temperatures of the hot and cold fluids, a large temperature difference, or temperature gradient, can exist between the mean temperature of the core 16 and the hot or cold fluids at the first and second inlet manifolds 42, 46, respectively. Resultant of increasing or decreasing temperatures in the core 16, thermal expansion and contraction of the core 16 can occur. Such expansion and contraction of the structurally rigid core 16 can cause thermal stresses at the junction between the core 16 and the manifolds 40. An additional and superimposed high temperature gradient condition can occur between a local hot section of the core adjacent to the cold inlet manifold fluid. A significant temperature gradient exists at this location. An opposite and similar condition exists at a local region between a cold fluid passage of the core and the hot inlet manifold fluid. The thermal stresses can be the result of the significant temperature change of the core 16 resulting in thermal expansion. Such thermal or structural stresses can result in fracture or deformation of the heat exchanger 12, which can reduce component life or require increased maintenance. Furthermore, such thermal stresses can be exacerbated due to a structurally stiff core 16, resultant of the complex geometry of the first and second sets of flow passages 30, 34 forming the core 16.

Additionally, thermal expansion of the core 16 can cause physical stresses at the junction between the manifolds 40 and the mounting flanges 62. As a result, the structurally stiff mounting flange 62 can be particularly susceptible to damage or deformation due to the increased combined thermal and structural or physical stresses.

Figure 4:
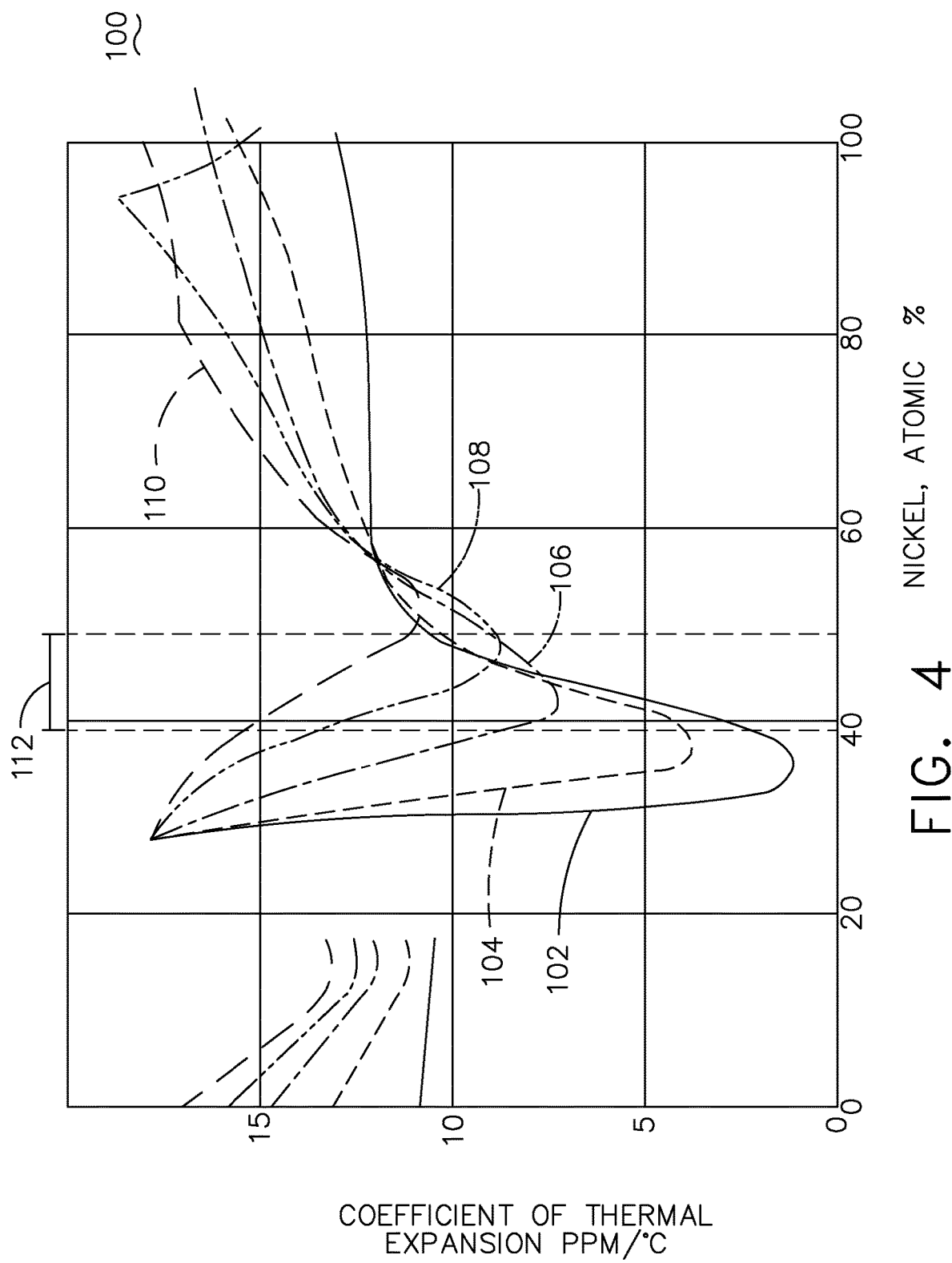
FIG. 4 is a plot graph illustrating the coefficient of thermal expansion for electroformed portions of the heat exchanger of FIG. 2, plotted against atomic nickel concentration for five different operating temperatures of the electroformed portions, in accordance with various aspects described herein.

Referring now to FIG. 4, a plot graph 100 illustrates five plots for five different operation temperatures for a heat exchanger, showing a CTE as parts per million per degrees Celsius (ppm/° C.), on the y-axis, plotted against an atomic percentage of nickel on the x-axis. Such an atomic percentage can be the percentage of nickel in an iron-nickel alloy, for example, which can be utilized to form the heat exchanger 12 or a portion thereof such as a manifold 40.

A first plot 102 illustrates an operational temperature for a manifold having a fluid at a temperature of 15 degrees Celsius (° C.). As is appreciable, the CTE for the first plot 102 is at a minimum between about 30-45 atomic percent nickel, shown as below 5 ppm/° C.

A second plot 104 illustrates an operational temperature for a manifold having a fluid at a temperature of 200° C. The CTE for the second plot 104 is at a minimum between about 35-42 atomic percent nickel, shown as between 4 and 7 ppm/° C.

A third plot 106 illustrates an operational temperature for a manifold having a fluid at a temperature of 300° C. The CTE for the third plot 106 is at a minimum between about 38-50 atomic percent nickel, shown as between 7-10 ppm/° C.

A fourth plot 108 illustrates an operational temperature for a manifold having a fluid temperature of 400° C. The CTE for the fourth plot 108 is at a minimum between about 45-55 atomic percent nickel, shown as between 8-10 ppm/° C.

A fifth plot 110 illustrates an operational temperature for a manifold having a fluid temperature of 500° C. The CTE for the fifth plot 110 is at a minimum between about 50-55 atomic percent nickel, shown as between 11-13 ppm/° C.

Therefore, a range 112 between about 38-50 atomic percent nickel for an alloy can provide for reducing a CTE over a wide range of operational temperatures, from about 0° C. to 500° C. Therefore, the manifold 40 having a percent nickel between about 38-50 percent can be utilized in a wide range of operational conditions or systems. However, it is contemplated that the manifold 40 can have a specific atomic percent nickel tailored to a specific manifold temperature or fluid temperature. For example, in a heat exchanger 12 expected to operate at 200° C., a manifold 40 having about 38 atomic percent nickel could be utilized to operate having a CTE of about 4 ppm/° C. As such, a range of 35-55 percent nickel or 40-50 percent nickel may be utilized to cover a wide range of operational temperatures, with more specific tailoring of the percent nickel directed to the specific temperature of the implementation. Smaller ranges such as 38-50 percent, or 40-50 percent nickel are also contemplated, or even smaller ranges tailored to a single operational temperature, such as between 35-40% nickel for a 200° C. operation temperature.

Without such tuning severe negative effects can occur due to the temperature gradient between the core 16 and the manifolds 40, the high structural stiffness of the monolithic core 16, and the rigid housing connections to adjacent fixed boundary conditions such as the mounting flanges 62. For example, during thermal growth of the core 16, the load path along the core at the manifolds 40 can cause localize thermal stresses which can lead to damage or low cycle fatigue fracturing of the heat exchanger 12. Similarly, the mounting flanges 62 for the heat exchanger 12 can be susceptible to thermal growth of the manifolds 40, which can lead to physical stresses at the mounting flanges 62, which can otherwise result in damage or fracturing of the heat exchanger 12.

The reduced CTE for the skin 18 or the manifolds 40 results in in reduced thermal growth of that portion of the heat exchanger 12. It should be appreciated that utilizing the nickel alloy having a specific atomic percent of nickel can tailored to have a reduced CTE, lesser that that of the core 16. The reduced CTE can be tailored based upon anticipated operational temperatures of the heat exchanger 12, the manifolds 40, or to a temperature gradient between the core 16 and the manifolds 40 or the skin 18. Utilizing the nickel alloys to reduce the CTE to be less than the core 16 can provide for reducing local thermal stresses at the manifolds 40 or the skin 18, especially at the mounting flanges 62 for mounting the heat exchanger 12. It should be appreciated that similar materials are contemplated, such as similar electrodeposited metal alloys having a reduced CTE. Such similar alloys can have unique percentages of the respective alloys to reduce the CTE based upon the anticipated operational temperatures of the heat exchanger or the temperature gradient with the core 16. Furthermore, the nickel alloys can provide for a high tensile strength. The high tensile strength can be better suited to the thermal stresses during operation of the heat exchanger 12, which can provide for increased component lifetime and reduced maintenance.

Figure 5:
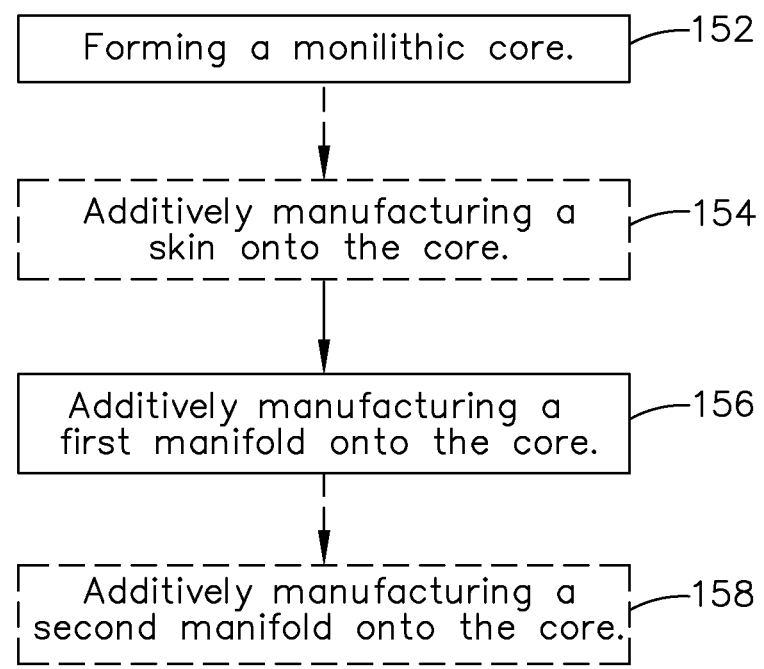
FIG. 5 is a flow chart illustrating a method of forming a heat exchanger such as the heat exchanger of FIG. 1.

Referring now to FIG. 5, a flow chart shows a method 150 of forming a heat exchanger, such as the heat exchanger 12 described herein. The method 150 begins at 152 with forming the monolithic core, such as the core 16. This can be done utilizing additive manufacturing or 3D printing. For example, the core 16 can be formed utilizing direct metal laser melting (DMLM) or direct metal laser sintering (DMLS). Forming the core 16 can include at least a first set of flow passages, such as the flow passages 30 as described herein. Such formation can form a monolithic core 16, having the first and second sets of flow passages 30, 34 defined through the core 16. Additionally, such techniques can provide for the complex geometries or organizations of the first and second flow passages 30, 34, facilitating heat exchange between fluids passing therethrough. In one example, the core 16 can be formed with aluminum. The core 16 can be have a first coefficient of thermal expansion, or can be made of a material having a first coefficient of thermal expansion. In one example, the core 16 can be made of a first material, such as aluminum, where the first coefficient of thermal expansion is greater than 20 ppm/° C., such as 24 or 25 ppm/° C.

Optionally, at 154 at least a portion of the skin 18 can be additively manufactured onto the core 16. By way of non-limiting example, the skin 18 can have a coefficient of thermal expansion that is less than the coefficient of thermal expansion of the core 16. The skin 18 can be formed by electroforming or electroplating. For example, the skin 18 can be formed of a Ni—Fe alloy having between 35-55% nickel, or 40-50% nickel, while any suitable concentration or range thereof based upon anticipated operating temperatures is contemplated. In one example, the skin 18 can be integrally formed onto the core 16.

At 156, a first manifold, such as the first inlet manifold 42, or a hot inlet manifold, can be additively manufactured onto the core 16. Such formation can form a unitary body as the combined core 16 and the first manifold, or a unitary body as the combined core 16, skin 18, and the first manifold. Additive manufacturing can include electroforming, electroplating, DMLM, or DMLS, for example, and can be controlled using direct or pulsed current power supplies. The first inlet manifold 42 can define a first fluid inlet, such as the first inlet 60, which is in fluid communication with the first set of flow passages 30. At least a portion of the first inlet manifold 42 can be formed of a second material, such as the Ni—Fe alloy, that has a coefficient of thermal expansion that is different than or less than a coefficient of thermal expansion of the core 16. For example, the Ni—Fe alloy can include an atomic percentage of nickel that is between 35-55% nickel, or 40-50% nickel, or having a coefficient that is between 5-10 ppm/° C. Alternatively, other percentages of nickel are contemplated, being specifically tailored to a particular anticipated heat exchanger operational temperature or temperature gradient. A coefficient of thermal expansion of 5-10 ppm/° C. is different from and less than that of the core 16 having a first material as aluminum, having a coefficient of thermal expansion that is about 24 ppm/° C. The lesser coefficient of thermal expansion for the first inlet manifold 42 can reduce thermal stresses at the first inlet manifold 42. It is further contemplated that a first portion of the first inlet manifold 42 can be formed to have a first coefficient of thermal expansion and a second portion of the first inlet manifold 42 can be formed to have a second coefficient of thermal expansion different than the first portion, where both portions have a coefficient of thermal expansion that is less than that of the core 16.

Optionally, at 156, a second manifold, such as the second inlet manifold 46, or a cold inlet manifold, can be additively manufactured onto the core 16. The second manifold and the core 16, or the skin 18, or both, can be formed as a unitary body. The second manifold can define a second fluid inlet that is in communication with the second set of flow passages 34. Similar to the first inlet manifold, the second manifold can be made of a second material, or even a third material, such as at least a portion of the second manifold formed having the Ni—Fe alloy and can include an atomic percentage of nickel that is between 35-55% or 40-50%, to have a coefficient of thermal expansion for the second manifold that is less than that of the core 16. Such manufacturing can include electroforming or electroplating, and can include controlled direct or pulsed current power supplies. Furthermore, the second manifold can have a coefficient of thermal expansion that is different than that of the first inlet manifold, such as having a coefficient of thermal expansion that is different from, greater, or lesser than the first inlet manifold, while still less than that of the core 16.

It should be appreciated that the heat exchanger 12 can be formed utilizing additive manufacturing, utilizing one or more method such as direct metal laser melting (DMLM), direct metal laser sintering (DMLS), electroforming, or electroplating, in non-limiting examples. Such formation can utilize controlled direct or pulsed current power supplies to determine a local concentration of material, such as a nickel concentration in a Fe—Ni alloy. Furthermore, separate portions of the heat exchanger 12 can be formed utilizing different method of additive manufacturing. For example, the core 16 can be formed by DMLM, while the manifolds 40 are formed using electroforming. Such methods enable a core 16 that has a high heat transfer coefficient, while the manifolds 40 can be made having a low CTE.

Figure 6:
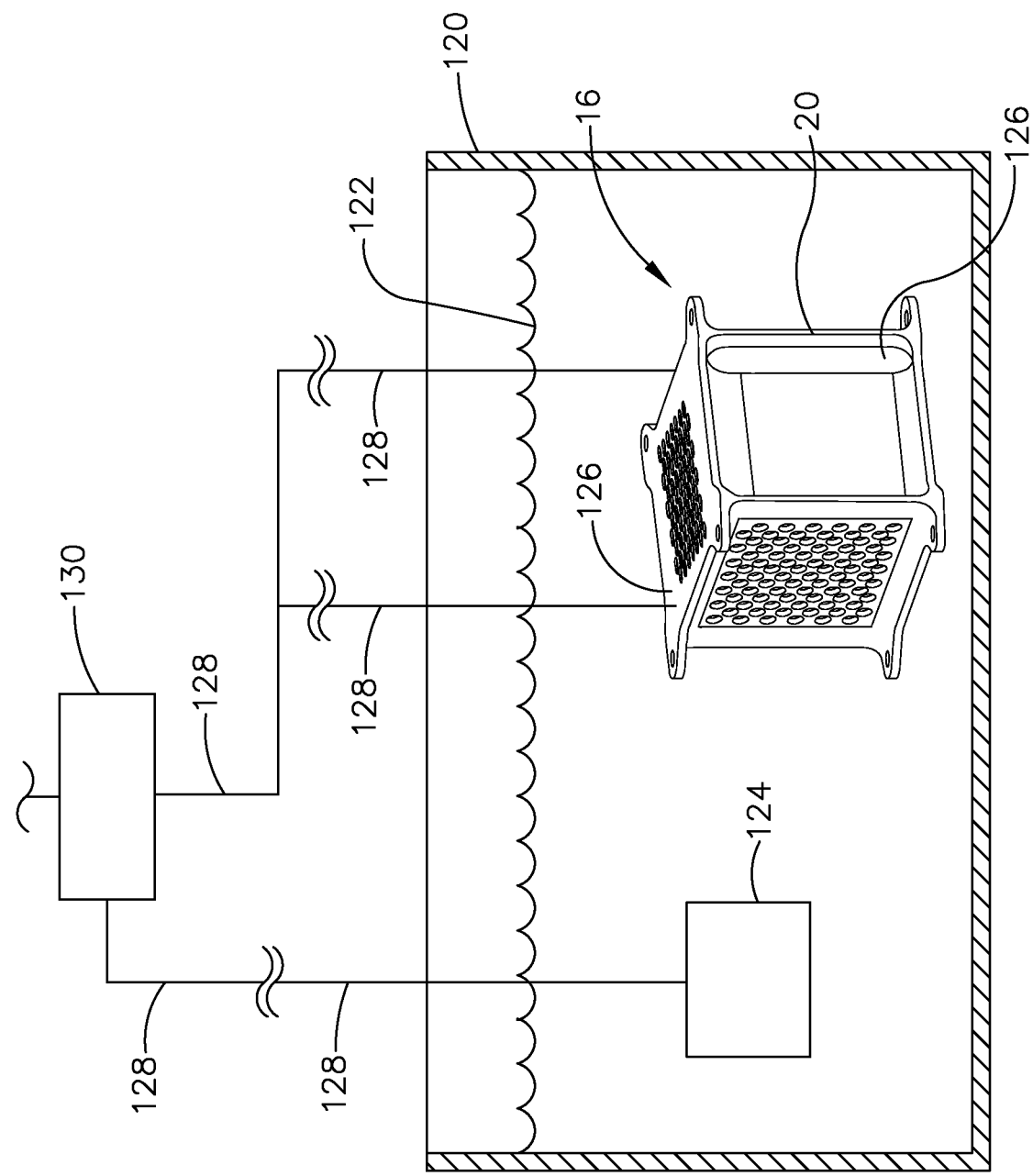
FIG. 6 is a schematic view of an electroforming bath including the heat exchanger core and a sacrificial anode, in accordance with various aspects described herein.

Referring now to FIG. 6, the core 16, shown as including the skin 18, can have been previously formed utilizing DMLM or DMLS, for example. The core 16 can then be placed in a bath tank 120. A metal constituent solution 122 can fill the bath tank 120. The metal constituent solution 122 can, by way of non-limiting example, be a nickel alloy as described above including a Ni—Fe alloy or nickel carrying iron ions. An anode 124 can be provided in the bath tank 120. The anode 124 can be a sacrificial anode or an inert anode, for example. The heat exchanger 12 can form a cathode 126, or multiple cathodes 126 along separate surfaces of the heat exchanger 12. As shown, at least a portion of the skin 18 can form a cathode surface 126, where the skin 18 is formed as having a nickel-iron (Ni—Fe) alloy, surrounding at least a portion of the core 16.

Electrical conduits 128 couple the anode 124 and the cathodes 126 to a controlled direct or pulsed current power supply 130, which can control electroforming or electroplating of the Ni—Fe portions of the heat exchanger 12. For example, the current provided to the bath tank 120 can control the rate of electroforming, or can even be used to determine the concentration of nickel formed onto the heat exchanger 12.

Figure 7:
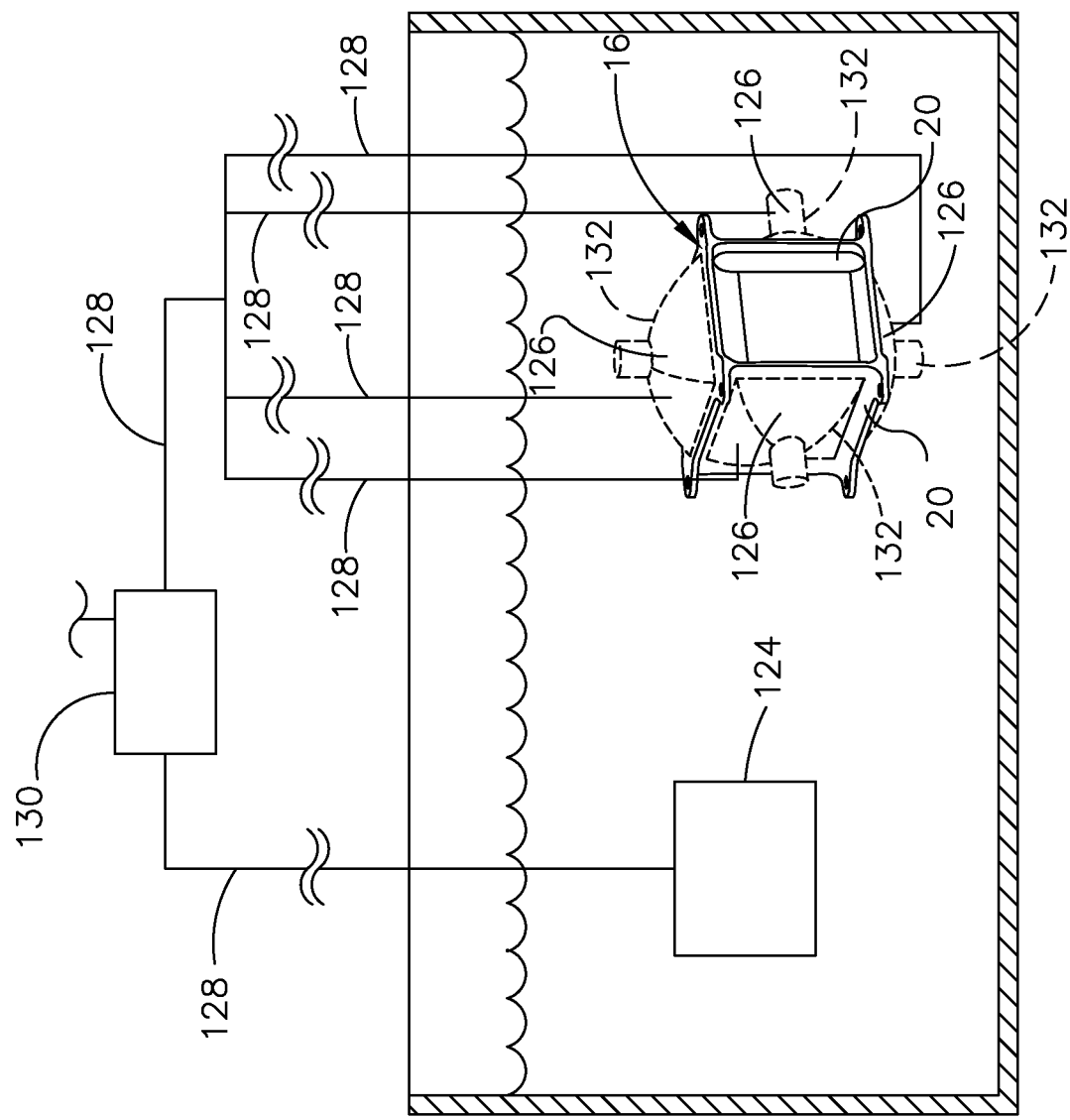
FIG. 7 is a schematic view of an electroforming bath including the heat exchanger core of FIG. 6 with sacrificial portions prepared for electroforming the first and second manifolds of FIG. 2, in accordance with various aspects described herein.

Referring now to FIG. 7, sacrificial manifold molds 132 can be provided on the core 16. The sacrificial manifold molds 132 can be made of an electrically conductive material permitting electroforming or electroplating at the sacrificial manifold molds 132. The remaining portions of the core 16 or the skin 18 can be prepared, such as covered with a non-conductive material to prevent electroforming onto the remainder of the core 16. Electrical conduits 128 can be coupled to the sacrificial manifold molds 132, utilizing the sacrificial manifold molds 132 as cathodes 126 to electroform the manifolds 40 to the core 16. The power supply 130, also coupled to the anode 124, can control electroforming or electroplating of the manifolds 40 to the core 16.

In one alternative example, a sacrificial mold can be made for the skin 18 in addition to the sacrificial manifold molds 132. As such, both the skin 18 and the manifolds 40 can be formed integrally and simultaneously with one another.

Figure 8:
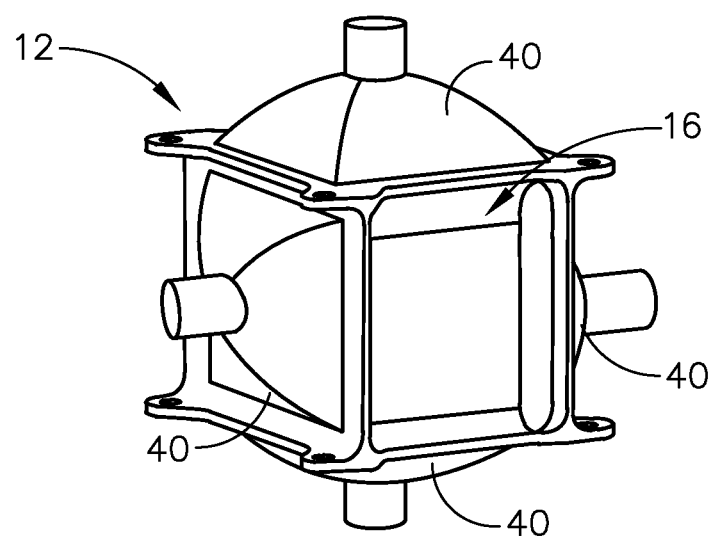
FIG. 8 is a perspective view of the heat exchanger core of FIG. 7, including electroformed manifolds formed onto the core, in accordance with various aspects described herein.

Referring now to FIG. 8, the manifolds 40 can be completely formed to the core 16, forming the heat exchanger 12, having the heat exchanger 12 removed from the bath tank 120 of FIGS. 5 and 6. The manifolds 40 are formed of the Ni—Fe alloy, and can have a predetermined atomic percentage of nickel, which can be used to reduce the CTE for the manifolds 40, such that the CTE for the manifolds 40 is less than that of the core 16. As such, the core 16 can be made of a material having high thermal conductivity, such as Aluminum, while the manifolds 40 are made of a material having a lesser CTE. The lesser CTE for the manifolds 40 reduces local thermal stresses of the heat exchanger 12 caused by expansion of the core 16 during operation of the heat exchanger.

It should be appreciated that as described herein, forming at least a portion of one or more heat exchanger manifolds, or the skin, or forming a load-bearing portion of the heat exchanger with a nickel alloy having a particular atomic percentage of nickel can be used to tune the coefficient of thermal expansion for that portion of the heat exchanger. More specifically, that portion of the heat exchanger can be formed to have a CTE that is less than that of the core or another portion of the heat exchanger. In some examples, the CTE for the manifold or the skin can be less than 15 ppm/° C., or even can be less than 10 ppm/° C., while an Aluminum core can have a CTE of 24 ppm/° C., for example.

Aspects of the present disclosure allow for a monolithic core formed of materials such as aluminum while having integral manifolds and skin formed of metal alloys having a lower CTE. This can result in reduced thermal stresses at the heat exchanger resultant of thermal growth during operation of the heat exchanger, which can lead to reduced damage to the heat exchanger and increased operational life, with reduced maintenance. Furthermore, utilizing the nickel alloys for the manifold or skin can result in portions of the heat exchanger having increased tensile strength, as compared to the materials utilized in the core. For example, the FeNi alloy can have an ultimate tensile strength of 500-900 megapascals (MPa). Therefore, it should be appreciated that the CTE and the tensile strength of the manifolds or the skin can be tuned by the percentage of nickel included in the electroformed alloy.

The heat exchangers as described herein can be made with additive manufacturing, such as electroforming the manifolds or the skin having the predetermined atomic percentage of nickel onto the core. Such manufacturing provides for precise forming of the manifolds or the skin having the particular desired atomic percentages of nickel.

Additionally, it should be appreciated that the elements described herein that are additively manufactured, such as the core 16, the skin 18, and the manifolds 40, can include in-situ features to further increase local structural strength of the heat exchanger 12. For example, ribs or iso-grids can be additively manufactured at high stress locations in order to provide additional strength or structural integrity. Such in-situ features can improve lifetime of the heat exchanger 12 and reduce required maintenance.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

To the extent not already described, the different features and structures of the various aspects may be used in combination with each other as desired. That one feature may not be illustrated in all of the aspects is not meant to be construed that it may not be, but is done for brevity of description. Thus, the various features of the different aspects may be mixed and matched as desired to form new aspects, whether or not the new aspects are expressly described. All combinations or permutations of features described herein are covered by this disclosure.

What is claimed is:

1. A method of forming a heat exchanger, the method comprising:
   forming a monolithic core having a first set of flow passages; and
   additively manufacturing onto the monolithic core a first manifold, where the first manifold defines a first fluid inlet that is in fluid communication with the first set of flow passages and at least a portion of the first manifold has a coefficient of thermal expansion less than a coefficient of thermal expansion of the monolithic core; wherein the first manifold includes between 45-55% nickel and the coefficient of thermal expansion for the first manifold is below 10 ppm/C at an operational temperature up to 400° C.

2. The method of claim 1 wherein the monolithic core and the first manifold are formed as a unitary body.

3. The method of claim 1 wherein the monolithic core is made of a first material and the first manifold is made of a second material different from the first material.

4. The method of claim 3 wherein the first material is aluminum.

5. The method of claim 1 wherein additively manufacturing includes electroforming.

6. The method of claim 5 wherein electroforming includes utilizing a controlled direct or pulsed current power supply.

7. The method of claim 5 wherein forming the monolithic core includes direct metal laser melting or direct metal laser sintering.

8. The method of claim 1 wherein forming the monolithic core further includes a second set of flow passages fluidly separate from the first set of flow passages.

9. The method of claim 8, further comprising additively manufacturing onto the monolithic core a second manifold, where the second manifold defines a second fluid inlet that is in fluid communication with the second set of flow passages and where the second manifold has a coefficient of thermal expansion less than the coefficient of thermal expansion of the monolithic core.

10. The method of claim 9 wherein the coefficient of thermal expansion of the first manifold is different from the coefficient of thermal expansion of the second manifold.

11. The method of claim 1, further comprising additively manufacturing onto at least a portion of the monolithic core a skin and where the skin has a coefficient of thermal expansion less than the coefficient of thermal expansion of the monolithic core.

12. The method of claim 1 wherein the first manifold is made of an iron-nickel alloy.

13. The method of claim 1 wherein the first manifold includes between 50-55% nickel and the coefficient of thermal expansion for the first manifold is below 13 ppm/C at an operational temperature up to 500° C.

14. A method of forming a heat exchanger, the method comprising:

forming a monolithic core having a first set of flow passages from a first material having a first coefficient of thermal expansion; and additively manufacturing a first manifold from a second material different than the first material onto the monolithic core in fluid communication with the first set of flow passages, with the first manifold having a second coefficient of thermal expansion lower than the first coefficient of thermal expansion;

wherein the second material is a nickel alloy having between 38-50% nickel and wherein the second coefficient of thermal expansion is below 10 ppm/C at an operational temperature up to 500° C.

15. The method of claim 14 wherein the nickel alloy has between 40-50% nickel.

16. The method of claim 14 wherein forming the monolithic core includes one of direct metal laser melting or direct metal laser sintering, and additively manufacturing the first manifold includes electroforming the first manifold.

17. The method of claim 16 wherein the monolithic core and the first manifold are formed as a unitary body.

18. The method of claim 14 further comprising additively manufacturing a skin onto the monolithic core, with the skin made of the nickel alloy having between 35-55% nickel.

19. A heat exchanger, comprising:

a monolithic core body having a first set of flow passages and a first coefficient of thermal expansion; and a first manifold unitarily formed with the monolithic core body in fluid communication with and defining a first fluid inlet for the first set of flow passages, and having a second coefficient of thermal expansion that is different than the first coefficient of thermal expansion;

wherein the first manifold includes between 45-55% nickel and the second coefficient of thermal expansion is below 10 ppm/C at an operational temperature up to 400° C.

20. The heat exchanger of claim 19 wherein the first coefficient of thermal expansion is less than the second coefficient of thermal expansion.

21. The heat exchanger of claim 19 further comprising a skin surrounding the monolithic core body and the first set of flow passages, the skin having a coefficient of thermal expansion that is less than the coefficient of thermal expansion of the monolithic core body.

22. The heat exchanger of claim 19 wherein the first manifold includes between 50-55% nickel and the coefficient of thermal expansion for the first manifold is below 13 ppm/C at an operational temperature up to 500° C.

* * * * *